United States Patent
Wang et al.

(10) Patent No.: US 11,899,891 B2
(45) Date of Patent: Feb. 13, 2024

(54) TOUCH SENSOR, TOUCH DISPLAY, AND ELECTRONIC DEVICE

(71) Applicant: HUAWEI TECHNOLOGIES CO., LTD., Shenzhen (CN)

(72) Inventors: Huan Wang, Shenzhen (CN); Junyong Zhang, Dongguan (CN); Gang Fang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 76 days.

(21) Appl. No.: 17/639,793

(22) PCT Filed: Sep. 4, 2020

(86) PCT No.: PCT/CN2020/113518
§ 371 (c)(1),
(2) Date: Mar. 2, 2022

(87) PCT Pub. No.: WO2021/043271
PCT Pub. Date: Mar. 11, 2021

(65) Prior Publication Data
US 2022/0291781 A1   Sep. 15, 2022

(30) Foreign Application Priority Data
Sep. 6, 2019   (CN) .......................... 201910840030.6

(51) Int. Cl.
*G06F 3/044*   (2006.01)
(52) U.S. Cl.
CPC .. *G06F 3/0446* (2019.05); *G06F 2203/04111* (2013.01)
(58) Field of Classification Search
CPC ......... G06F 3/0446; G06F 2203/04111; G06F 2203/04102; G06F 3/0448; G06F 1/1652;
(Continued)

(56) References Cited

U.S. PATENT DOCUMENTS 10,133,406 B2    11/2018   Choi
10,296,116 B2 *   5/2019   Sun ...................... G06F 3/0443
(Continued)

FOREIGN PATENT DOCUMENTS

CN   103999024 A   8/2014
CN   105867709 A   8/2016
(Continued)

OTHER PUBLICATIONS

Liu LingLing, "Development of a Flexible Position-Sensing Detector for Touch Control," Jan. 2011, with the English Abstract; 87 total pages.

(Continued)

*Primary Examiner* — Amy Onyekaba
(74) *Attorney, Agent, or Firm* — Rimon PC

(57) ABSTRACT

This application provides a touch sensor, a touch display, and an electronic device. The touch sensor includes a substrate, a bridge electrode line, and an electrode layer. The electrode layer includes at least a first electrode pattern, the first electrode pattern includes a plurality of first conductive units spaced from each other, a boundary line of the first conductive unit includes a curved connecting segment, the connecting segment includes at least one first concave and convex portion, and first concave and convex portions are sequentially connected to form a smooth curve. The bridge electrode line extends in a curve, and two ends respectively cross connecting segments of two adjacent first conductive units, and electrically connect the two first conductive units. The touch sensor provided in the embodiments of this application improves bending resistance performance of a touch electrode.

14 Claims, 10 Drawing Sheets

(58) Field of Classification Search
CPC .................. G06F 3/0412; G06F 3/044; G06F 2203/04103
See application file for complete search history.

(56) References Cited

U.S. PATENT DOCUMENTS

| | | | | |
|---|---|---|---|---|
| 10,303,314 | B2* | 5/2019 | Choi | G06F 3/0446 |
| 11,237,675 | B2* | 2/2022 | Choi | G06F 3/0446 |
| 11,320,949 | B2* | 5/2022 | Gong | G06F 3/0446 |
| 11,327,612 | B2* | 5/2022 | Choi | G06F 3/0443 |
| 2009/0020343 | A1* | 1/2009 | Rothkopf | H03K 17/955 178/18.05 |
| 2013/0133435 | A1* | 5/2013 | Muramatsu | G01B 7/18 73/799 |
| 2014/0055702 | A1* | 2/2014 | Park | H10K 59/131 257/40 |
| 2015/0062028 | A1* | 3/2015 | Go | G06F 1/1616 345/173 |
| 2015/0153862 | A1* | 6/2015 | Nakamura | G06F 1/1626 345/173 |
| 2015/0177878 | A1* | 6/2015 | Cheng | G06F 3/0448 345/174 |
| 2015/0181716 | A1 | 6/2015 | Jaw et al. | |
| 2016/0259447 | A1* | 9/2016 | Lin | G06F 3/0446 |
| 2017/0083160 | A1* | 3/2017 | Hashida | G02F 1/136286 |
| 2017/0147133 | A1 | 5/2017 | Choi | |
| 2017/0277325 | A1* | 9/2017 | Xie | G06F 3/0412 |
| 2017/0285801 | A1 | 10/2017 | Choi et al. | |
| 2019/0114011 | A1* | 4/2019 | Kim | G06F 3/044 |
| 2019/0163306 | A1* | 5/2019 | Wang | G06F 3/0448 |
| 2019/0227646 | A1 | 7/2019 | Ye | |
| 2020/0310594 | A1* | 10/2020 | Yang | G06F 3/0444 |
| 2020/0333918 | A1* | 10/2020 | Lin | G06F 3/0446 |
| 2021/0365151 | A1* | 11/2021 | Zhang | G06F 3/04164 |
| 2021/0373713 | A1* | 12/2021 | Kwon | G06F 3/0448 |

FOREIGN PATENT DOCUMENTS

| | | |
|---|---|---|
| CN | 105912164 A | 8/2016 |
| CN | 205486028 U | 8/2016 |
| CN | 106293202 A | 1/2017 |
| CN | 106775145 A | 5/2017 |
| CN | 107632740 A | 1/2018 |
| CN | 108052239 A | 5/2018 |
| CN | 108334215 A | 7/2018 |
| CN | 108598290 A | 9/2018 |
| CN | 109002205 A | 12/2018 |
| CN | 109388294 A | 2/2019 |
| CN | 109508118 A | 3/2019 |
| CN | 109917969 A | 6/2019 |
| CN | 110162214 A | 8/2019 |
| JP | 2010271782 A | 12/2010 |
| KR | 20160116462 A | 10/2016 |

OTHER PUBLICATIONS

Zhang Xiao-xiang et al., "GOA unit defect in TFT-LCD industry," Chinese Journal of Liquid Crystals and Displays, vol. 30, No. 3, Jun. 2015, with the English Abstract' 6 total pages.

Liang Hongfei et al., "Research on testing linearity of resistant touch panel," Sensor World, Dec. 2008, with the English Abstract; 5 total pages.

* cited by examiner

TOUCH SENSOR, TOUCH DISPLAY, AND ELECTRONIC DEVICE

This application is a national stage of International Application No. PCT/CN2020/113518, filed on Sep. 4, 2020, which claims priority to Chinese Patent Application No. 201910840030.6, filed on Sep. 6, 2019. Both of the aforementioned applications are hereby incorporated by reference in their entireties.

TECHNICAL FIELD

Embodiments of this application relate to the field of electronic devices, and in particular, to a touch sensor, a touch display, and an electronic device.

BACKGROUND

A touchscreen is also referred to as a "touch display". A user can directly operate and issue an instruction by using an object displayed on the touch display. The touch display provides a humanized operation interface between the user and an electronic product, and implements a good human-computer interaction function. Therefore, display apparatuses with a touch function are increasingly used. Touch displays may be classified into a vector pressure sensing touchscreen, a resistive touchscreen, a capacitive touchscreen, an infrared touchscreen, and a surface acoustic wave touchscreen.

For an existing capacitive touchscreen, when a hand of a user touches the capacitive touchscreen, a capacitive change generated between a touch electrode on the capacitive touchscreen and static electricity of a human body is converted into an induced current, to determine a touch position of the user hand. To ensure a display effect and electrical performance, an existing touch electrode is generally made of a transparent metal material. Due to limitations of a thickness and the material of the touch electrode, flexibility of the touch electrode is relatively poor. In an application of a foldable touch display, after a plurality of times of bending, a crack easily occurs in a bent bending area, causing the touch electrode to be disconnected, and further causing a function failure of the touch display.

SUMMARY

Embodiments of this application provide a touch sensor, a touch display, and an electronic device. The touch sensor improves bending resistance performance of a touch electrode, and resolves a problem in the prior art that after the touch electrode is bent a plurality of times, a crack easily occurs in a bending area, causing the touch electrode to be disconnected, and further causing a function failure of the touch display.

According to a first aspect, an embodiment of this application provides a touch sensor, including:
a substrate;
an electrode layer formed on the substrate, where
the electrode layer includes at least a first electrode pattern, the first electrode pattern includes a plurality of first conductive units spaced from each other, the first conductive unit has a boundary line, the boundary line includes a curved connecting segment, the connecting segment includes at least one first concave and convex portion, and the first concave and convex portions are sequentially connected to form a smooth curve; and
a bridge electrode line, where two ends of the bridge electrode line respectively cross connecting segments of two adjacent first conductive units to electrically connect the two first conductive units, the bridge electrode line extends in a curve, the bridge electrode line includes at least one second concave and convex portion, and second concave and convex portions are sequentially connected to form a smooth curve.

The first concave and convex portions include concave portions and convex portions, and the concave portions and the convex portions are sequentially alternately connected to form a smooth curve without angles. In other words, the boundary line of the first conductive unit is a curve formed by the concave portions and the convex portions sequentially alternately connected. In this way, stress concentration towards the boundary line of the first conductive unit when a display is bent is alleviated, to reduce breakage that occurs on the first conductive unit due to stress concentration when the display is bent and that causes a touch failure of the display. The bridge electrode line is set to a curve, so that reliability of the bridge electrode line is improved, and breakage occurring on the bridge electrode line due to stress concentration when the display bends can be reduced.

In a possible implementation, according to the touch sensor provided in this embodiment of this application,
the boundary line of the first conductive unit is a polygon, the connecting segment forms an edge line of the polygon, and a rounded corner transition is implemented between the connecting segment and an adjacent edge line.

In this way, stress concentration that occurs when the display is bent and that causes breakage of the first conductive unit is further reduced. Visibility of the first electrode pattern is reduced, and touch sensitivity is improved.

In a possible implementation, according to the touch sensor provided in this embodiment of this application,
the connecting segment of the first conductive unit includes an arc-shaped first concave portion and first convex portion; and
the bridge electrode line includes an arc-shaped second concave portion and second convex portion.

In a possible implementation, according to the touch sensor provided in this embodiment of this application,
the connecting segments of the two adjacent first conductive units are disposed opposite to each other, and a first concave and convex portion on a connecting segment of one of the first conductive units is disposed corresponding to a first concave and convex portion on a connecting segment of the other adjacent first conductive unit.

In a possible implementation, according to the touch sensor provided in this embodiment of this application,
at least two bridge electrode lines are included, and second concave and convex portions on the bridge electrode lines are correspondingly disposed.

In a possible implementation, according to the touch sensor provided in this embodiment of this application,
the electrode layer further includes a second electrode pattern, the second electrode pattern includes a plurality of second conductive units, and the second conductive units are sequentially electrically connected.

In a possible implementation, according to the touch sensor provided in this embodiment of this application,
the first conductive units in the first electrode pattern are arranged in a first direction, the second conductive units in the second electrode pattern are arranged in a second direction, and the first direction is perpendicular to the second direction.

In a possible implementation, according to the touch sensor provided in this embodiment of this application, the first conductive units have contact holes, and the two ends of the bridge electrode line respectively cross the connecting segments of the two adjacent first conductive units, and are electrically connected to the contact holes.

In a possible implementation, according to the touch sensor provided in this embodiment of this application, the contact holes on the two adjacent first conductive units are interleaved. In this way, positions of contact holes on different first conductive units are staggered, so that an overall extension direction of the bridge electrode line is not an X-axis direction or a Y-axis direction, thereby reducing stress concentration phenomena in the overall extension direction of the bridge electrode line.

In a possible implementation, according to the touch sensor provided in this embodiment of this application, the touch sensor further includes at least one first etched stripe and at least one second etched stripe, and first etched stripes and second etched stripes are interleaved.

In a possible implementation, according to the touch sensor provided in this embodiment of this application, the first etched stripe is in an arc shape or an I shape with a connecting portion being an arc; and the second etched stripe is in the arc shape or the I shape with the connecting portion being an arc.

According to a second aspect, an embodiment of this application provides a touch display, including a display and the touch sensor provided in the foregoing embodiment, where the touch sensor is located on the display. The touch sensor includes a first electrode pattern. A first concave and convex portion of a first conductive unit on the first electrode pattern can alleviate stress concentration towards a boundary line of the first conductive unit when the display is bent, to reduce breakage that occurs on the first conductive unit due to stress concentration when the display is bent and that causes a touch failure of the display. A bridge electrode line is set to a curve, so that reliability of the bridge electrode line is improved, and breakage occurring on the bridge electrode line due to stress concentration when the display is bent can be reduced.

According to a third aspect, an embodiment of this application provides an electronic device, including a housing and the touch display provided in the foregoing embodiment, where the touch display is connected to the housing, and the touch display and the housing are connected together to form an accommodation space for accommodating a component.

This application provides a touch sensor, a touch display, and an electronic device. The touch sensor includes a first electrode pattern. A first concave and convex portion of a first conductive unit on the first electrode pattern can alleviate stress concentration towards a boundary line of the first conductive unit when the display is bent, to reduce breakage that occurs on the first conductive unit due to stress concentration when the display is bent and that causes a touch failure of the display. A bridge electrode line is set to a curve, so that reliability of the bridge electrode line is improved, and breakage occurring on the bridge electrode line due to stress concentration when the display is bent can be reduced.

REFERENCE SIGNS IN THE ACCOMPANYING DRAWINGS

100: mobile phone;
10: display; 11: display layer; 12: flexible cover layer; 13: touch sensor; 131: first electrode pattern; 1311: first conductive unit; 1312: boundary line; 1313: connecting segment; 1314: first concave and convex portion; 1315: first concave portion; 1316: first convex portion; 1317: contact hole; 132: bridge electrode line; 1321: second concave and convex portion; 1322: second concave portion; 1323: second convex portion; 133: second electrode pattern; 1331: second conductive unit; 1332: convex structure; 1333: concave structure; 134: first etched stripe; 1341: connecting portion; 135: second etched stripe; 136: dummy pattern; 137: insulation layer;
20: middle frame; 21: metal medium plate; 22: frame;
30: rear cover

DESCRIPTION OF EMBODIMENTS

An electronic device provided in an embodiment of this application includes, but is not limited to, a mobile phone, a tablet computer, a notebook computer, an ultra-mobile personal computer (UMPC), a handheld computer, a walkie-talkie, a netbook, a POS terminal, a personal digital assistant (PDA), a wearable device, a virtual reality (VR) device, an augmented reality (AR) device, a mixed reality (MR) device, and the like.

For ease of description, in this embodiment of this application, a mobile phone 100 is used as an example to describe the electronic device.

Figure 1:
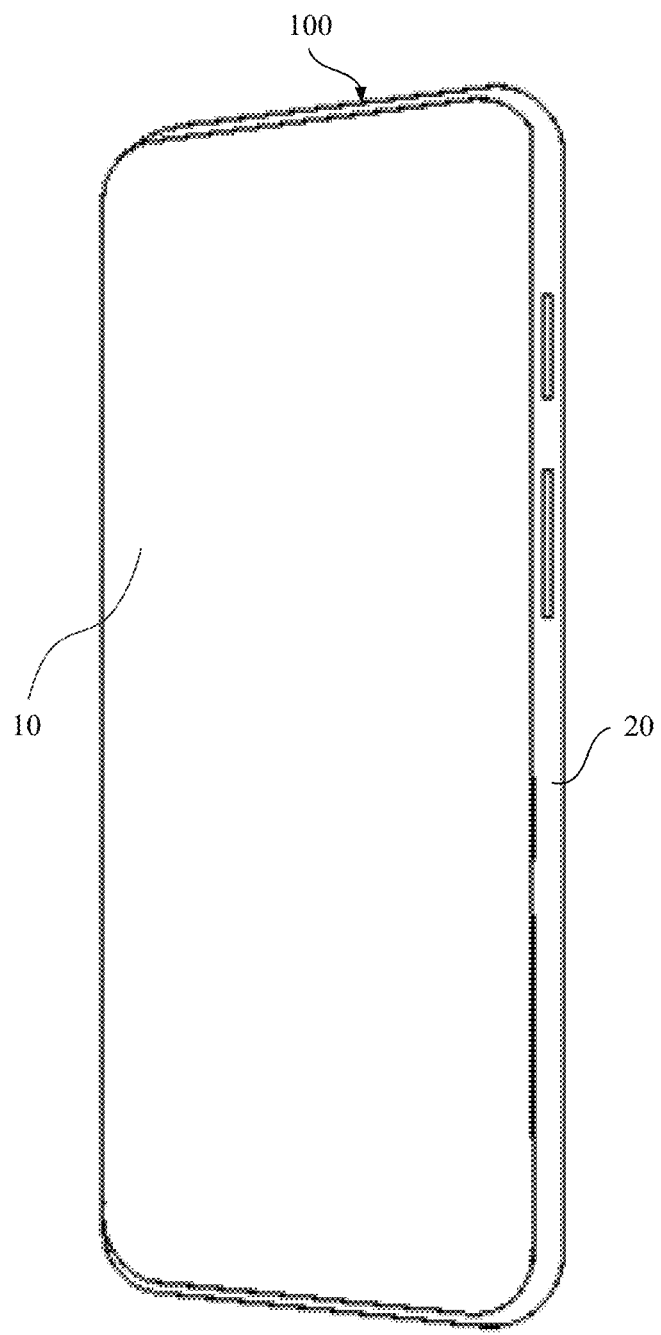
FIG. 1 is a schematic structural diagram of an electronic device according to an embodiment of this application.
Figure 2:
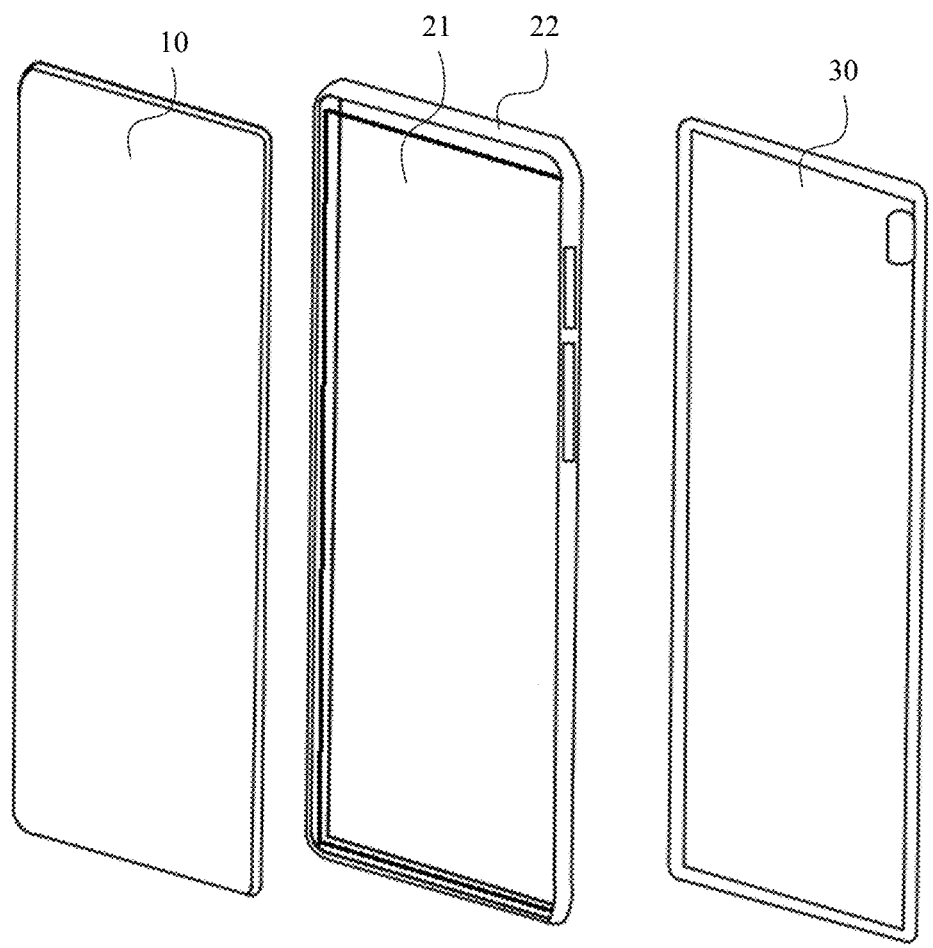
FIG. 2 is a schematic diagram of a split structure of an electronic device according to an embodiment of this application.

The mobile phone 100 provided in this embodiment of this application may be a foldable mobile phone. FIG. 1 is a schematic structural diagram of an electronic device according to an embodiment of this application. FIG. 2 is a schematic diagram of a split structure of an electronic device according to an embodiment of this application. FIG. 1 and FIG. 2 respectively show an overall structure and a split structure of the mobile phone 100. Referring to FIG. 1 and FIG. 2, the mobile phone 100 may include a display 10 and a housing. The display 10 and the housing together form an accommodation space in which components can be accommodated. The components may include a circuit board, a processor, a battery, and the like. The housing may include a middle frame 20 and a rear cover 30. The middle frame 20 is located between the display 10 and the rear cover 30. The display 10 is connected to one side of the middle frame 20, and the rear cover 30 is connected to the other side of the middle frame 20. The display 10, the rear cover 30, and the middle frame 20 together form the accommodation space in which the components can be accommodated. The circuit board and the battery may be disposed on the middle frame 20. For example, the circuit board and the battery are disposed on a side of the middle frame 20 facing the rear cover 30. Alternatively, the circuit board and the battery may be disposed on a side of the middle frame 20 facing the display 10. When the circuit board is disposed on the middle frame 20, an opening may be provided on the middle frame 20, to place a component on the circuit board at the opening of the middle frame 20.

When the battery is disposed on the middle frame 20, for example, a battery compartment may be disposed on the side of the middle frame 20 facing the rear cover 30, and the battery is installed in the battery compartment. In this embodiment of this application, the battery may be connected to the circuit board by using a charging management module and a power management module. The power management module receives an input from the battery and/or the charging management module, and supplies power to the processor, an internal memory, an external memory, the display 10, a camera, a communications module, and the like. The power management module may be further configured to monitor parameters such as battery capacity, battery cycle times, and battery health status (current leakage and impedance). In some other embodiments, the power management module may alternatively be disposed in the processor of the circuit board. In some other embodiments, the power management module and the charging management module may alternatively be disposed in a same component.

It may be understood that the schematic structure in this embodiment of this application does not constitute a specific limitation on the mobile phone 100. In some other embodiments of this application, the mobile phone 100 may include more or fewer components than those shown in the figure, or have some components combined, or have some components split, or have a different component arrangement. The components shown in the figure may be implemented by hardware, software, or a combination of software and hardware.

The rear cover 30 may be a metal rear cover, a glass rear cover, a plastic rear cover, or a ceramic rear cover. A material of the rear cover 30 is not limited in this embodiment of this application.

The middle frame 20 may include a metal medium plate 21 and a frame 22. The frame 22 is disposed once around along an outer periphery of the metal medium plate 21. For example, the frame 22 may include a top edge and a bottom edge that are disposed opposite to each other, and two side edges that are located between the top edge and the bottom edge and that are disposed opposite to each other. A manner for connecting the frame 22 and the metal medium plate 21 includes, but is not limited to, welding, clamping, or one-piece injection molding. A material of the metal medium plate 21 may be aluminum, an aluminum alloy, or a stainless steel material. A material of the frame 22 may be metal, glass, plastic, or ceramic. It should be noted that materials of the metal medium plate 21 and the frame 22 include, but are not limited to, the foregoing materials.

Figure 3:
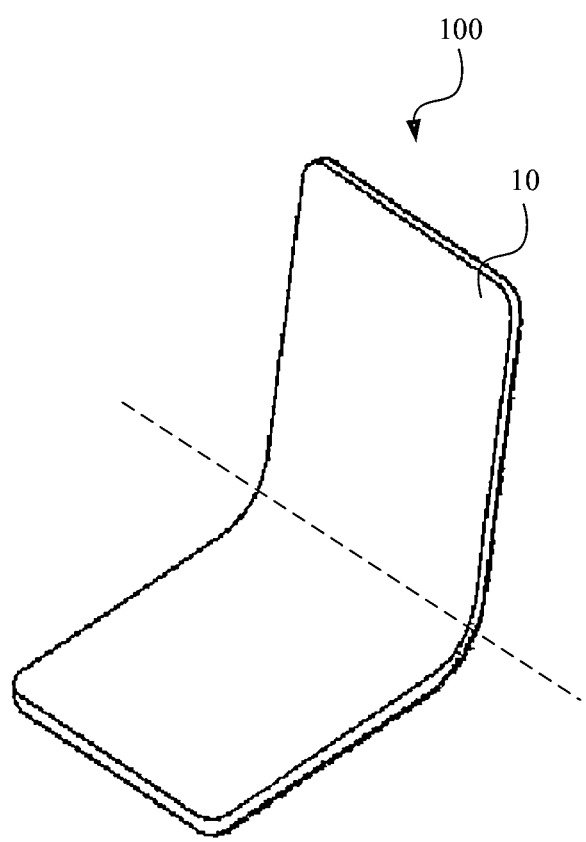
FIG. 3 is a schematic structural diagram of a folded state of an electronic device according to an embodiment of this application.
Figure 4:
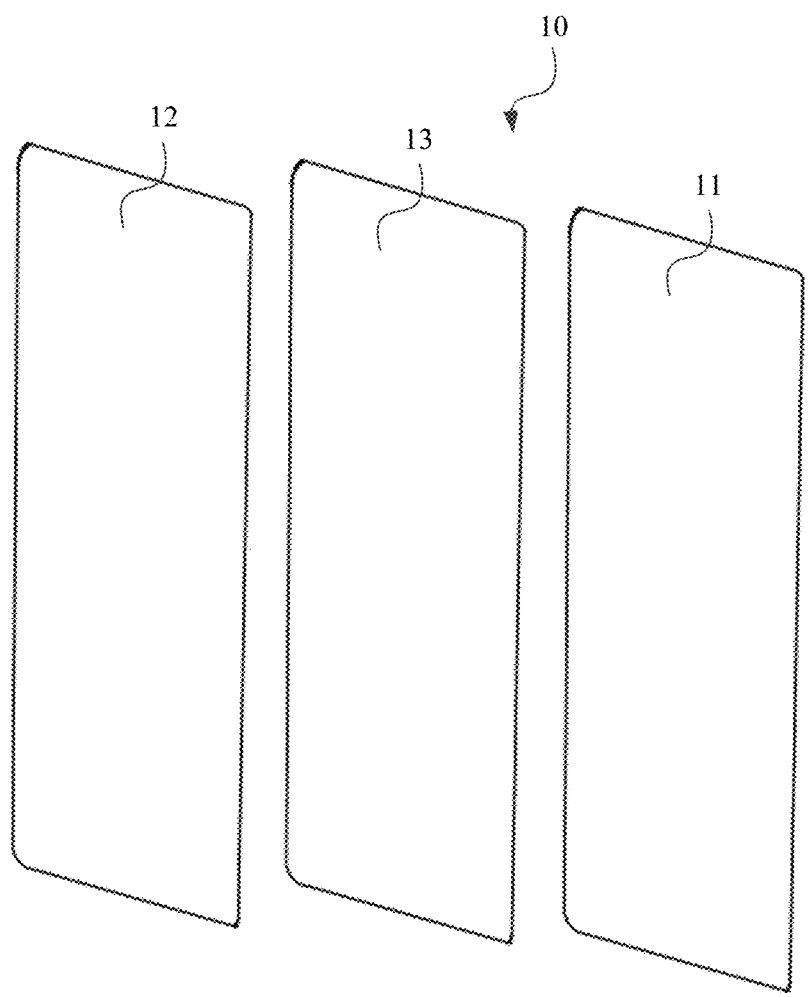
FIG. 4 is a schematic diagram of a split structure of a display in an electronic device according to an embodiment of this application.

FIG. 3 is a schematic structural diagram of a folded state of an electronic device according to an embodiment of this application. FIG. 4 is a schematic diagram of a split structure of a display in an electronic device according to an embodiment of this application. Referring to FIG. 3, in this embodiment of this application, because the display 10 needs to be bent, the display 10 may be a flexible display. For example, the flexible display may be an organic light-emitting diode (OLED) display.

Generally, referring to FIG. 4, when the display 10 is an OLED display, the display 10 may include a display layer 11 and a flexible cover layer 12. The flexible cover layer 12 covers the display layer 11. A size of the flexible cover layer 12 may be greater than or equal to a size of the display layer 11. Because the display 10 needs to be bendable, the flexible cover layer 12 may be a flexible cover that can be bent. The display layer 11 may include a plurality of functional layers. The plurality of functional layers may be, for example, film layers such as an organic light-emitting layer, an anode layer, a cathode layer, or a thin film transistor (TFT) layer. Therefore, the display layer 11 has a plurality of metal layers.

In another example, the display 10 may further include a touch sensor 13. The touch sensor 13 may be disposed between the display layer 11 and the flexible cover layer 12. Alternatively, the touch sensor 13 may be integrated into the display layer 11, to form a touch display that integrates touch and display functions, and the flexible cover layer 12 covers the touch display.

Figure 5:
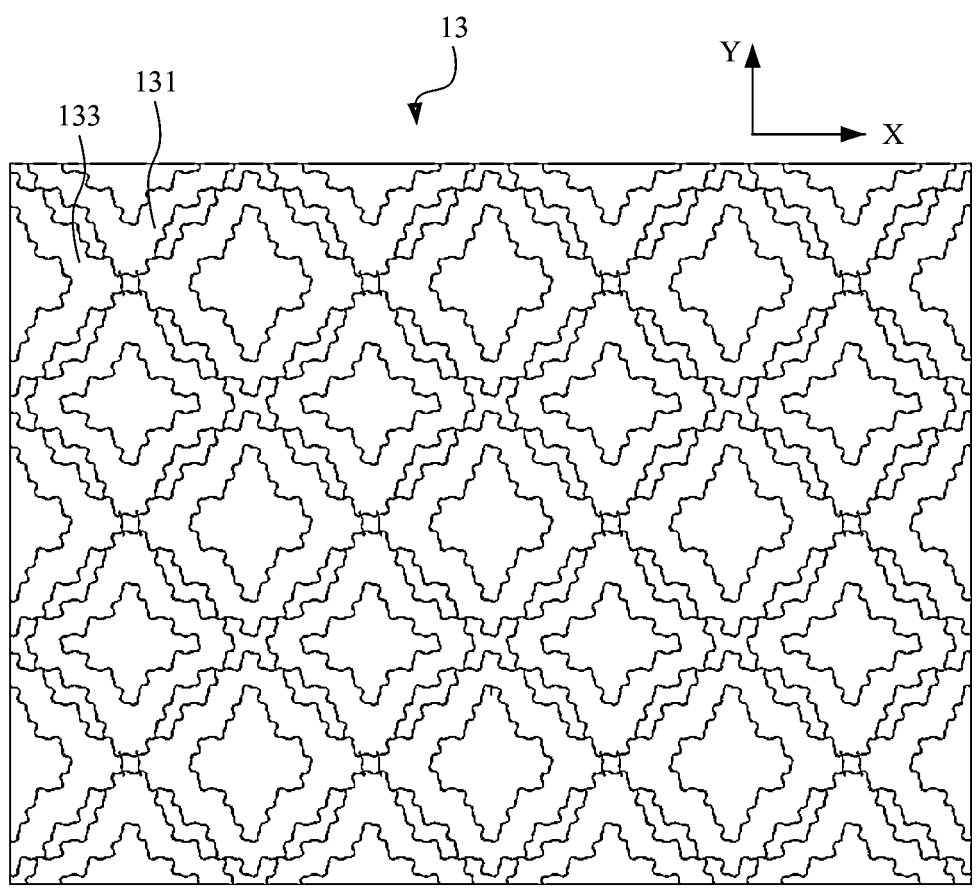
FIG. 5 is a schematic structural diagram of a touch sensor in an electronic device according to an embodiment of this application.
Figure 6:
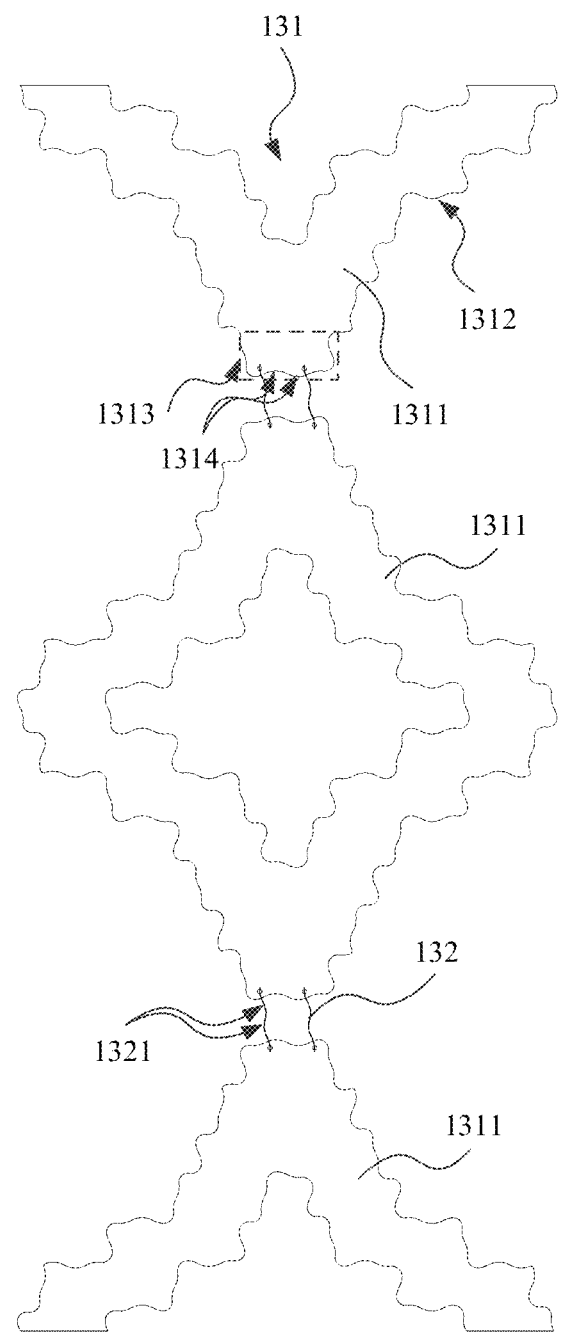
FIG. 6 is a schematic structural diagram of a first electrode pattern and a bridge electrode line in a touch sensor in an electronic device according to an embodiment of this application.
Figure 7:
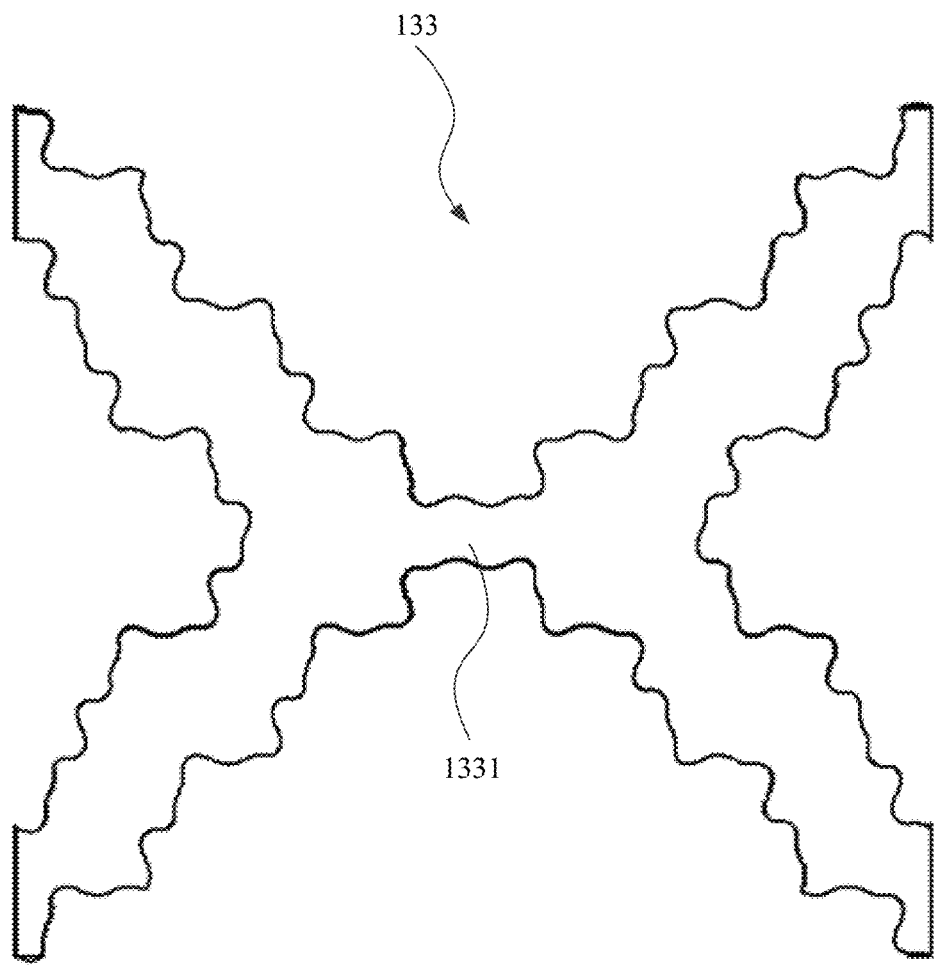
FIG. 7 is a schematic structural diagram of a second electrode pattern in a touch sensor in an electronic device according to an embodiment of this application.

FIG. 5 is a schematic structural diagram of a touch sensor in an electronic device according to an embodiment of this application. FIG. 6 is a schematic structural diagram of a first electrode pattern and a bridge electrode line in a touch sensor in an electronic device according to an embodiment of this application. FIG. 7 is a schematic structural diagram of a second electrode pattern in a touch sensor in an electronic device according to an embodiment of this application. Referring to FIG. 5 to FIG. 7, the touch sensor 13 may include a substrate and an electrode layer formed on the substrate.

The electrode layer includes at least a first electrode pattern 131, the first electrode pattern 131 includes a plurality of first conductive units 1311 spaced from each other, the first conductive unit 1311 has a boundary line 1312, the boundary line 1312 includes a curved connecting segment 1313, the connecting segment 1313 includes at least one first concave and convex portion 1314, and first concave and convex portions 1314 are sequentially connected to form a smooth curve. The boundary line 1312 is an edge line of the first conductive unit 1311. The boundary line 1312 of the first conductive unit 1311 includes a plurality of parts. In other words, the boundary line 1312 is divided into a plurality of segments. Two segments of the boundary line 1312 are curved connecting segments 1313 (the boundary line 1312 in a dashed-line box in FIG. 6), the two connecting segments 1313 are respectively located on opposite sides of the first conductive unit 1311, and other segments of the boundary line 1312 may be arcs, straight lines, curves, or the like.

Two ends of a bridge electrode line 132 respectively cross connecting segments 1313 of two adjacent first conductive units 1311 to electrically connect the two first conductive units 1311. The bridge electrode line 132 extends in a curve. The bridge electrode line 132 includes at least one second concave and convex portion 1321, and second concave and convex portions 1321 are sequentially connected to form a smooth curve.

A plurality of columns of first conductive units 1311 may be disposed in a vertical direction, and first conductive units 1311 located in a same column are connected by using bridge electrode lines 132. The following description is made by using a manner in which three first conductive units 1311 are sequentially connected by using bridge electrode lines 132. Each first conductive unit 1311 has a first connecting segment 1313 and a second connecting segment 1313 that are opposite to each other. A first connecting segment 1313 of a Pt first conductive unit 1311 is opposite to a second connecting segment 1313 of a $2^{nd}$ first conductive unit 1311, and a bridge electrode line 132 crosses the first connecting segment 1313 of the $1^{st}$ first conductive unit 1311 and the second connecting segment 1313 of the $2^{nd}$ first conductive unit 1311, to connect the $1^{st}$ first conductive unit 1311 and the $2^{nd}$ first conductive unit 1311. A first connecting segment 1313 of the $2^{nd}$ first conductive unit 1311 is opposite to a second connecting segment 1313 of a $3^{rd}$ first conductive unit 1311, to connect the $2^{nd}$ first conductive unit 1311 and the $3^{rd}$ first conductive unit 1311. By analogy, first conductive units 1311 located in a same column are connected by using bridge electrode lines 132.

When the display 10 is bent, a crack in a bent area is mainly generated in an area of the bridge electrode line 132. This is mainly caused by stress concentration occurring on the connecting segment 1313 that is of the first conductive unit 1311 and that is located in the area of the bridge electrode line 132 and the bridge electrode line 132 when the display 10 is bent. Therefore, in this embodiment of this application, the connecting segment 1313 to which the bridge electrode line 132 crosses includes at least one first concave and convex portion 1314, and first concave and convex portions 1314 are sequentially connected to form a smooth curve.

The first concave and convex portions 1314 include concave portions and convex portions, and the concave portions and the convex portions are sequentially alternately connected to form a smooth curve without angles. In other words, the boundary line 1312 of the first conductive unit 1311 is a curve formed by the concave portions and the convex portions sequentially alternately connected. In this way, stress concentration towards the boundary line 1312 of the first conductive unit 1311 when the display 10 is bent is alleviated, to reduce breakage that occurs on the first conductive unit 1311 when the display 10 is bent and that causes a touch failure of the display 10.

When the connecting segment 1313 of the first conductive unit 1311 is set to a curve formed by concave portions and convex portions sequentially alternately connected, the bridge electrode line 132 is also set to be curved. The bridge electrode line 132 extends in a curve, the bridge electrode line 132 may include at least one second concave and convex portion 1321, and second concave and convex portions 1321 are sequentially connected to form a smooth curve. The bridge electrode line 132 is set to a curve, so that reliability of the bridge electrode line 132 is improved, and breakage occurring on the bridge electrode line 132 due to stress concentration when the display 10 is bent can be reduced.

Structures of the second concave and convex portion 1321 and the first concave and convex portion 1314 may be the same. This is not limited in this embodiment. Curvatures of the concave portions and the convex portions in the connecting segment 1313 and the bridge electrode line 132 are not particularly limited. For example, radii of the concave portions and the convex portions may be 0.02 mm to 0.1 mm. If the radii of the concave portions and the convex portions are less than 0.02 mm, due to proximity to a non-curved right angle, cracks and visibility of the first electrode pattern 131 are barely suppressed. If the radii exceed 0.1 mm, due to proximity to a straight line, it is difficult to reflect dense concave portions and convex portions, and cracks and visibility of the first electrode pattern 131 are barely suppressed. To achieve dense concave portions and convex portions to maximize crack and visibility suppression, the radii of the concave portions and the convex portions may be 0.02 mm to 0.05 mm.

The first electrode pattern 131 may be directly formed on the display layer 11. In other words, the touch sensor 13 is integrated into the display layer 11 to form a touch display that integrates touch and display functions. The first electrode pattern 131 may alternatively be formed on the substrate. A material of the substrate may include, but is not limited to, glass, polyethersulphone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), cellulose triacetate (TAC), and cellulose acetate propionate (CAP).

A material of the first electrode pattern 131 may include, but is not limited to, ITO (indium tin oxide), IZO (indium zinc oxide), ZnO (zinc oxide), a carbon nanotube (CNT), an Ag (silver) nanowire, a conductive polymer, graphene, or an alloy. Any metal having good conductivity and low resistance may be used as the material of the first electrode pattern 131. This is not limited in this embodiment. The first electrode pattern 131 may be formed on the substrate through photolithography.

The electrode layer further includes a second electrode pattern 133, the second electrode pattern 133 includes a plurality of second conductive units 1331, and the second conductive units 1331 are sequentially electrically connected. The plurality of second conductive units 1331 may be disposed in a plurality of rows in a horizontal direction, and adjacent second conductive units 1331 are electrically connected. The second electrode pattern 133 and the first electrode pattern 131 may be located at a same layer, or the second electrode pattern 133 and the first electrode pattern 131 may be located at different layers. Materials of the second electrode pattern 133 and the first electrode pattern 131 may be the same.

The first conductive units 1311 in the first electrode pattern 131 are arranged in a first direction, the second conductive units 1331 in the second electrode pattern 133 are arranged in a second direction, and the first direction is perpendicular to the second direction. In other words, the first conductive units 1311 and the second conductive units 1331 are disposed in different directions. For example, the first conductive units 1311 may be disposed in a direction along an X axis in a rectangular coordinate system, and correspondingly, the second conductive units 1331 are disposed in a direction along a Y axis in the rectangular coordinate system. Alternatively, the first conductive units 1311 may be disposed in the direction along the Y axis in the rectangular coordinate system, and correspondingly, the second conductive units 1331 are disposed in the direction along the X axis in the rectangular coordinate system.

The touch display further includes a detection electrode, a processing circuit, and a drive electrode. The drive electrode and the detection electrode are both located on an upper surface of the substrate. The first conductive unit 1311 and the second conductive unit 1331 are located on the upper surface of the substrate. The first conductive unit 1311 is a drive electrode, and the second conductive unit 1331 is a detection electrode. Alternatively, the first conductive unit 1311 is a detection electrode, and the second conductive unit 1331 is a drive electrode. The first conductive unit 1311 and the second conductive unit 1331 provide information about an X coordinate and a Y coordinate of a touch position. To be specific, if a hand of a person or an object touches the touch sensor 13, whether a finger touch occurs is determined by detecting a capacitance change between the first conductive unit 1311 and the second conductive unit 1331. In addition, the first conductive units 1311 and the second conductive units 1331 are arrayed in an X-axis direction and a Y-axis direction, and a specific position of the finger touch is determined by detecting, by using a Touch IC, a capacitance change triggered by the finger, and is converted into X-coordinate and Y-coordinate information of the touch position, and input to the mobile phone 100.

In the touch display, the first conductive unit 1311 may have a plurality of different shapes and disposing manners. For example, in an optional implementation, the boundary line 1312 of the first conductive unit 1311 may be a polygon, the connecting segment 1313 forms an edge line of the polygon, and a rounded corner transition is implemented between the connecting segment 1313 and an adjacent edge line. In this way, stress concentration that occurs when the display 10 is bent and that causes breakage of the first conductive unit 1311 is further reduced. Visibility of the first electrode pattern 131 is reduced, and touch sensitivity is improved.

In this case, the first conductive unit 1311 is wholly in a polygon shape. To detect an electrical parameter such as capacitance, the first conductive units 1311 are disposed in a pair. In this case, the connecting segment 1313 may form an edge line of a polygon edge of the first conductive unit 1311, and the edge line is disposed towards or adjacent to the other first conductive unit 1311, so that the connecting segment 1313 and a connecting segment 1313 on the other first conductive unit 1311 are connected by using the bridge electrode line 132.

Figure 8:
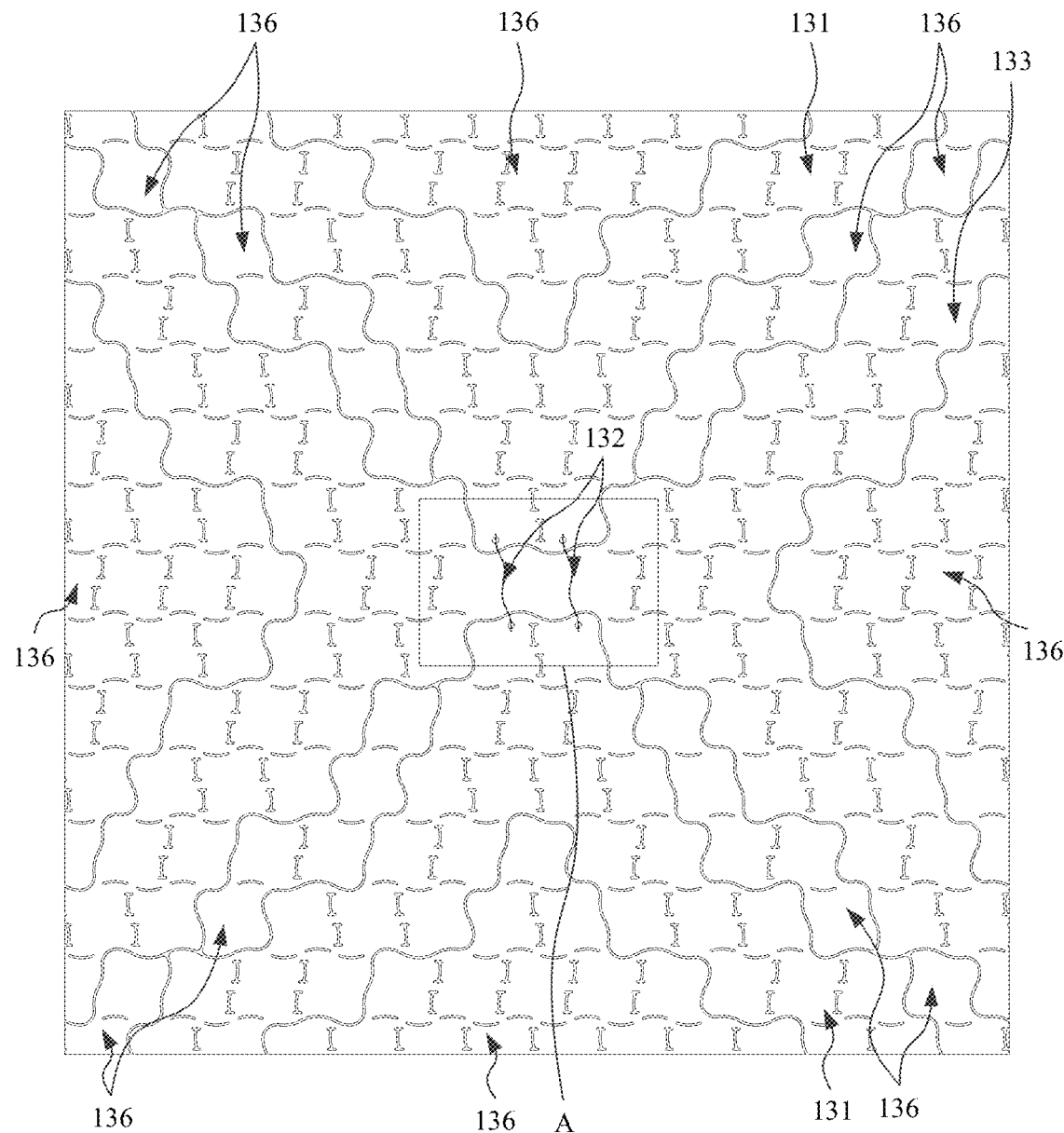
FIG. 8 is a schematic structural diagram of a sensing pattern subunit in a touch sensor in an electronic device according to an embodiment of this application.
Figure 9:
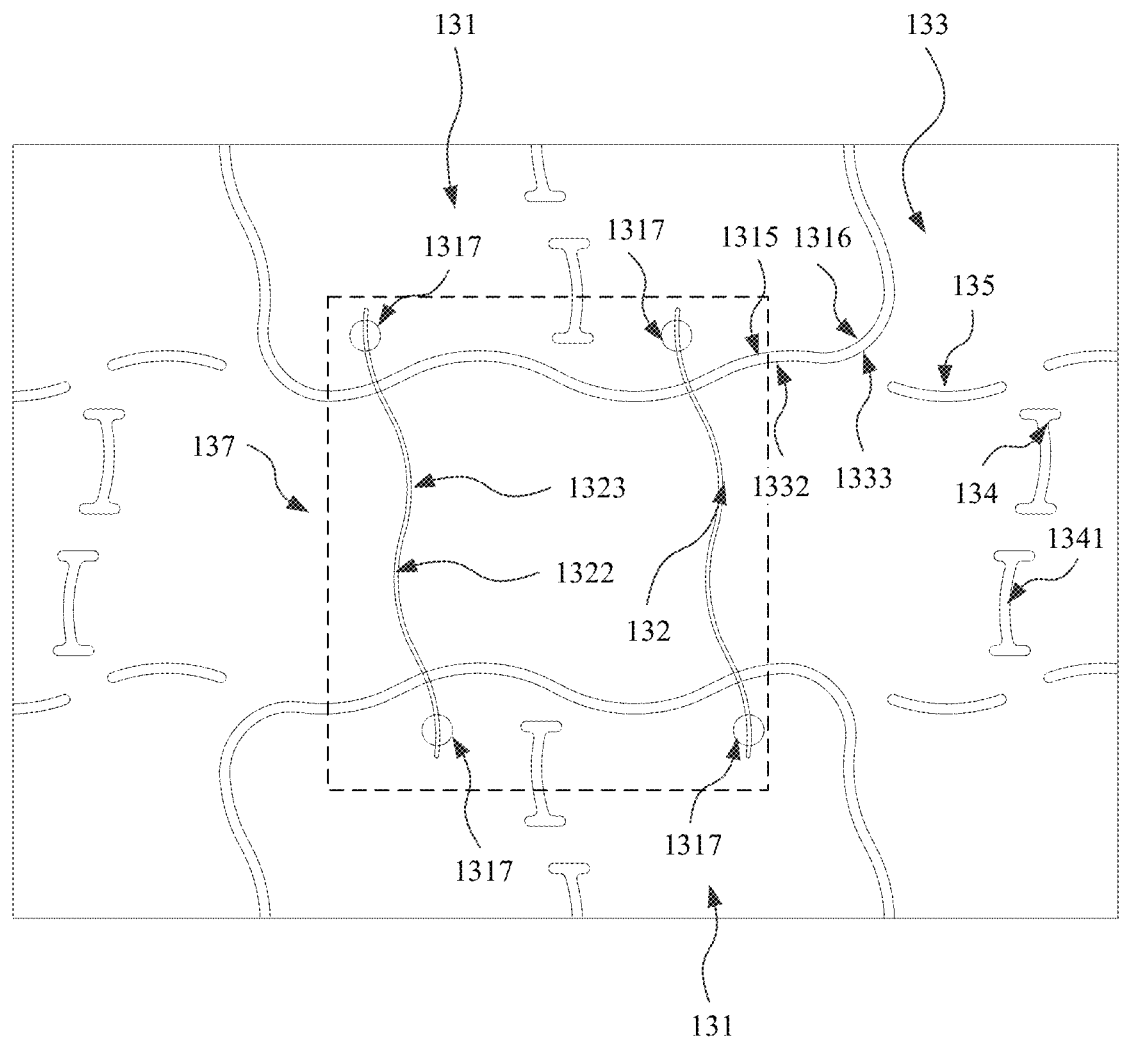
FIG. 9 is a partial enlarged view of A in FIG. 8.
Figure 10:
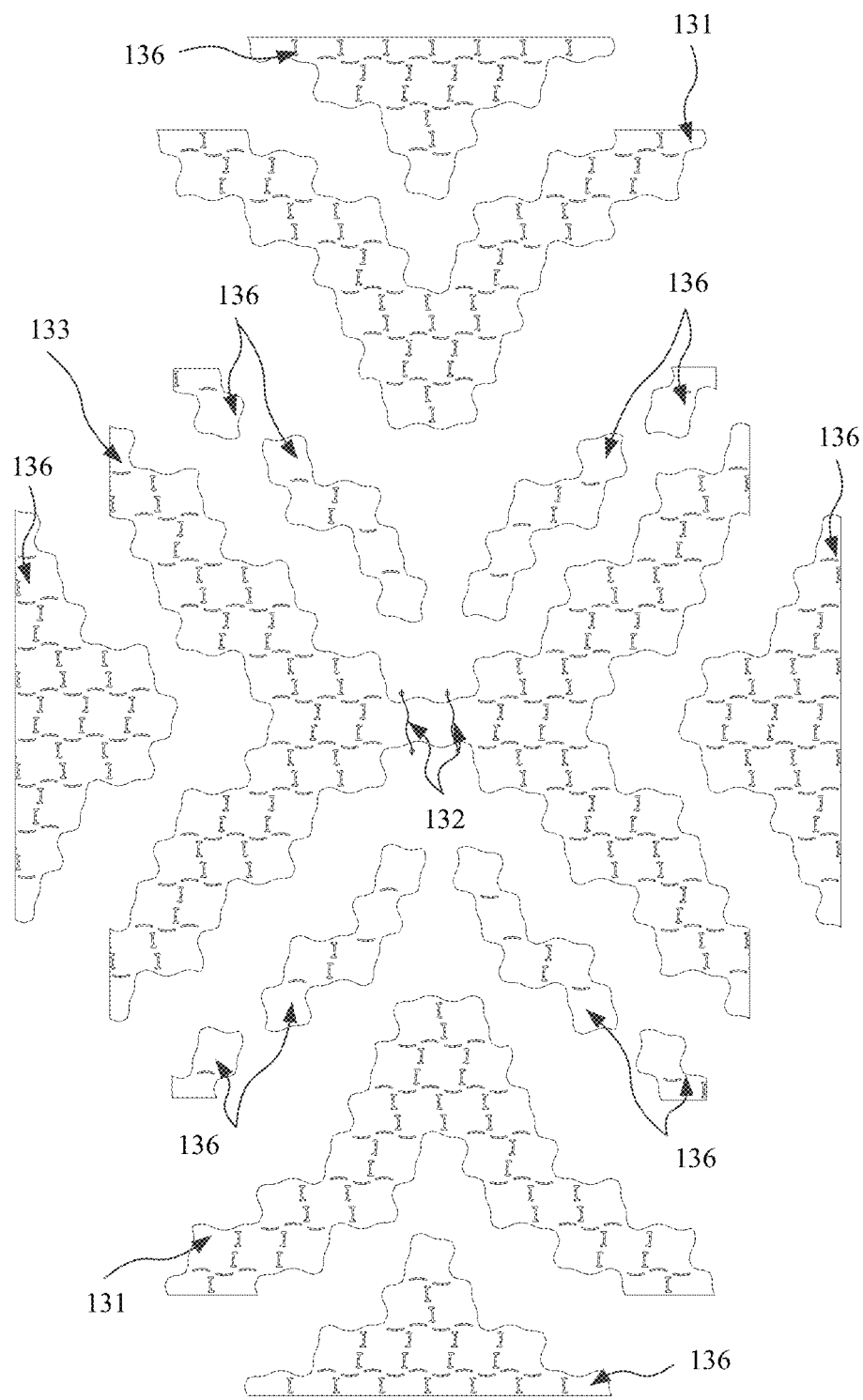
FIG. 10 is a schematic diagram of a split structure of FIG. 8.

The first electrode patterns 131 and the second electrode patterns 133 are arranged in a form of a rectangular array to form regular sensing pattern units. FIG. 8 is a schematic structural diagram of a sensing pattern subunit in a touch sensor in an electronic device according to an embodiment of this application. FIG. 9 is a partial enlarged view of A in FIG. 8. FIG. 10 is a schematic diagram of a split structure of FIG. 8. Referring to FIG. 8 to FIG. 10, there are a plurality of sensing pattern units, each sensing pattern unit may include at least two first conductive units 1311 and at least two second conductive units 1331, and the two second conductive units 1331 are electrically connected to each other.

The first electrode pattern 131 and the second electrode pattern 133 may be disposed at a same layer. In this case, the first conductive unit 1311 in the first electrode pattern 131 and the second conductive unit 1331 in the second electrode pattern 133 may be disposed adjacent to each other, the second conductive unit 1331 separates two adjacent first conductive units 1311, and the two adjacent first conductive units 1311 are electrically connected by using the bridge electrode line 132. From the foregoing detection principle of the first conductive unit 1311 and the second conductive unit 1331, it can be learned that the two adjacent first conductive units 1311 and the two adjacent second conductive units 1331 may respectively detect an X coordinate and a Y coordinate of a touch position, to obtain touch information of a user.

In the sensing pattern unit, the two second conductive units 1331 may be connected as a whole. For example, the two second conductive units 1331 may be connected as a whole by using connecting portions on the second conductive units 1331, and the two adjacent first conductive units 1311 are separated by the two second conductive units 1331 connected as a whole. In addition, the connecting segment 1313 in the boundary line 1312 of the first conductive unit 1311 is disposed opposite to the other first conductive unit 1311. In this case, connecting segments 1313 of the two first conductive units 1311 are opposite to each other, and are disposed adjacent to the connecting portions between the two second conductive units 1331.

Specifically, the connecting segment 1313 of the first conductive unit 1311 is in a curved shape, and correspondingly, the connecting portions between the two second conductive units 1331 may be in a curved shape corresponding to the connecting segment 1313. For example, in the sensing pattern unit, a connecting segment 1313 of each first conductive unit 1311 protrudes towards another adjacent first conductive unit 1311, and the connecting segment 1313 includes a plurality of first concave and convex portions 1314 that are sequentially connected. Correspondingly, the second conductive unit 1331 and a part of the connecting portion adjacent to the connecting segment 1313 also have a concave-convex structure formed by a plurality of segments that are sequentially connected, and a shape of the concave-convex structure coincides with a shape of the connecting segment 1313. For example, the concave-convex structure is a convex structure 1332 and a concave structure 1333. Shapes of the convex structure 1332 and a concave in the first concave and convex portion 1314 match and coincide with each other, and shapes of the concave structure 1333 and a convex in the first concave and convex portion 1314 match and coincide with each other. In this way, each first concave and convex portion 1314 has a corresponding boundary shape on the second conductive unit 1331. A smooth curve is formed on both the connecting segment 1313 and the connecting portion on the second conductive unit 1331. Therefore, a common area between the two adjacent first conductive units 1311 and the two adjacent second conductive units 1331 can alleviate and release stress, thereby avoiding a stress concentration phenomenon and avoiding a breakage phenomenon of the display 10 in the area.

Optionally, the connecting segment 1313 of the first conductive unit 1311 may include a first concave portion 1315 and a first convex portion 1316, and the first concave portion 1315 and the first convex portion 1316 are sequentially disposed, so that the connecting segment 1313 forms a multi-segment arc structure, and different segments of the arc structure are bent in different directions.

Specifically, to reduce stress concentration, the first concave portion 1315 and the first convex portion 1316 may be arc-shaped, and an arc transition may be implemented between the first concave portion 1315 and the first convex portion 1316. In this way, each segment of the connecting segment 1313 is a smooth arc, and no stress concentration phenomenon occurs due to a sharp edge. Quantities of first concave portions 1315 and first convex portions 1316 in the connecting segment 1313 may be each greater than or equal to three. Optionally, a quantity of first concave portions 1315 ranges between three and six, and a quantity of first convex portions 1316 ranges between three and six.

The connecting segment 1313 of the first conductive unit 1311 may include first concave portions 1315 and first convex portions 1316. Correspondingly, the second conductive unit 1331 and the part of the connecting portion adjacent to the connecting segment 1313 also have a concave-convex structure formed by a plurality of segments that are sequentially connected, and a shape of the concave-convex structure coincides with the shape of the connecting segment 1313, to reduce stress concentration on the connecting portion of the second conductive unit 1331. For example, the concave-convex structure may be a convex structure 1332 and a concave structure 1333. Shapes of the convex structure 1332 and the first concave portion 1315 match and coincide with each other, and shapes of the concave structure 1333 and the first convex portion 1316 match and coincide with each other. Specifically, both the convex structure 1332 and the concave structure 1333 may be arcs. The first concave portion 1315 is an arc recessed towards the inside of the first conductive unit 1311, and correspondingly, the convex structure 1332 is an arc protruding towards the outside of the second conductive unit 1331. In other words, two circles with different radii are drawn with a same center inside the second conductive unit 1331, the first concave portion 1315 is an arc of a circle with a larger radius, and the convex structure 1332 is an arc that is of a circle with a smaller radius and that is opposite to the first concave portion 1315. The first convex portion 1316 is an arc recessed towards the outside of the first conductive unit 1311, and correspondingly, the concave structure 1333 is an arc protruding towards the inside of the second conductive unit 1331. In other words, two circles with different radii are drawn with a same center inside the first conductive unit 1311, the first convex portion 1316 is an arc of a circle with a smaller radius, and the concave structure 1333 is an arc that is of a circle with a larger radius and that is opposite to the first convex portion 1316.

The boundary line 1312 of the first conductive unit 1311 may be all curved connecting segments 1313. In other words, the boundary line 1312 is formed by first concave portions 1315 and first convex portions 1316 that are sequentially connected. An angle subtended by the first concave portions 1315 and the first convex portions 1316 in the connecting segments 1313 may be the same or different. Correspondingly, an edge line (which may also be referred to as a boundary line of the second conductive unit 1331) of the second conductive unit 1331 is formed by convex structures 1332 and concave structures 1333 that are sequentially connected. An angle subtended by the convex structures 1332 may be the same or may be different, and of the angle subtended by the concave structures 1333 may be the same or may be different.

Correspondingly, the bridge electrode line 132 may also have a similar concave-convex structure. Specifically, in an optional manner, the bridge electrode line 132 may include an arc-shaped second concave portion 1322 and an arc-shaped second convex portion 1323. The second concave portion 1322 and the second convex portion 1323 are sequentially connected, to avoid a sharp edge on the bridge electrode line 132, and reduce stress concentration phenomena on the bridge electrode line 132.

It may be understood that specific shapes and disposing manners of the second concave portion 1322 and the second convex portion 1323 on the bridge electrode line 132 are similar to the foregoing shapes and disposing manners of the first concave portion 1315 and the first convex portion 1316 on the connecting segment 1313 of the first conductive unit 1311, and details are not described herein again.

In an optional manner, at least two bridge electrode lines 132 may be included, and second concave and convex portions 1321 on the bridge electrode lines 132 are correspondingly disposed.

Specifically, because the connecting segment 1313 of the first conductive unit 1311 is an arc, there may be two or more bridge electrode lines 132, so that different bridge electrode lines 132 are all connected to the connecting segment 1313. In this way, the bridge electrode lines 132 may form smaller resistance and can have less interference, thereby ensuring that the first electrode pattern accurately detects capacitance. Concave and convex directions of the second concave and convex portions 1321 on the bridge electrode lines 132 are consistent. Therefore, when the touch sensor and the display 10 are bent, forces are relatively even, to avoid a phenomenon that the bridge electrode lines 132 are broken due to the bending.

In addition, when the touch sensor 13 and the touch display are manufactured, a polishing process or the like is needed to flatten the touch sensor 13, and a polishing rate of a low pattern density area is higher than a polishing rate of a high pattern density area. Therefore, the touch sensor 13 has different thicknesses because of different pattern densities of different areas inside the touch sensor 13, resulting in a problem such as poor pattern uniformity. In addition, different pattern densities of different areas may generate different refractive indexes, resulting in that a relatively obvious visual boundary is formed between the first electrode pattern 131, the second electrode pattern 133, and another area in the touch sensor 13, and is seen by a user, thereby affecting a visual effect of the touch sensor 13.

To improve the pattern density uniformity in the touch sensor 13, a dummy pattern 136 may be disposed in the low pattern density area of the touch sensor 13. In this way, an area in which the touch sensor 13 is located may have a relatively uniform pattern density, to improve uniformity of the touch sensor 13, improve a product yield, and avoid an obvious visual boundary formed between electrode patterns in the touch sensor 13. Specifically, in an optional manner, for the touch sensor 13 in this application, a dummy pattern 136 electrically separated from the first electrode pattern 131 and the second electrode pattern 133 may be disposed between the first electrode pattern 131 and the second electrode pattern 133, or a dummy pattern 136 may be disposed in the first electrode pattern 131.

The touch sensor 13 may be divided into a sensing area configured to sense a touch operation and an invalid area that is electrically separated from an electrode pattern in the sensing area. The sensing area mainly includes the first electrode pattern 131 and the second electrode pattern 133, and the invalid area mainly includes the dummy pattern 136. Because the dummy pattern 136 and the invalid area are electrically separated from the first electrode pattern 131 or the second electrode pattern 133, when the user touches the dummy pattern 136, a sensing electrode formed by the first electrode pattern 131 and the second electrode pattern 133 is not affected.

Specifically, at least a part of a boundary of the dummy pattern 136 may correspond to boundaries of the first electrode pattern 131 and the second electrode pattern 133. In this case, when the first electrode pattern 131 and the second electrode pattern 133 have undulating boundary curves, correspondingly, at least a part of the boundary of the dummy pattern 136 may have concave portions and convex portions that are sequentially connected, to form a smooth curve. In this way, a boundary shape of the dummy pattern 136 and a boundary shape of the first electrode pattern 131 or the second electrode pattern 133 correspond to and match each other. For example, boundary shapes of the first electrode pattern 131 and the second electrode pattern 133 coincide with each other. Therefore, an area in which the dummy pattern 136 is present between the first electrode pattern 131 and the second electrode pattern 133 is relatively small, so that a boundary and a shape formed by the first electrode pattern 131 and the second electrode pattern 133 may be relatively blurred, and are not easily perceived by the user.

There may be a plurality of dummy patterns 136. In other words, a plurality of dummy patterns 136 that are separated from each other are included. In this way, the dummy pattern 136 may be divided into a plurality of patterns, and the dummy patterns 136 may be independent of each other, so that the touch sensor 13 and the entire touch display are more flexible, making it convenient to bend.

A person skilled in the art may understand that the dummy pattern 136 may have a thickness similar to that of the first electrode pattern 131 or the second electrode pattern 133, so that the entire touch sensor 13 has a relatively flat and consistent structure. The thickness of the dummy pattern 136 may be a thickness commonly used by a person skilled in the art. For example, the thickness of the dummy pattern 136 may range between 10 nm and 350 nm.

Similar to the first electrode pattern 131 and the second electrode pattern 133, the dummy pattern 136 may be made of a material the same as or similar to that of the first electrode pattern 131 or the second electrode pattern 133, so that there is a small refractive index difference between an area in which the first electrode pattern 131 or the second electrode pattern 133 is present and the invalid area in which the dummy pattern 136 is located.

In addition, when the dummy pattern 136 is formed, a method for forming the dummy pattern 136 may be a pattern forming method commonly used by a person skilled in the art. For example, the dummy pattern 136 may be formed by using the foregoing method for forming the first electrode pattern 131 or the second electrode pattern 133. This is not limited herein. It may be understood that the dummy pattern 136 may be formed in a same working procedure or etching process as the first electrode pattern 131 and the second electrode pattern 133, or may be formed in a different working procedure and etching process than the first electrode pattern 131 or the second electrode pattern 133.

In addition, because the first conductive units 1311 in the first electrode pattern 131 may be connected by using the bridge electrode line 132, the touch sensor 13 in this application may further include an insulation layer 137 to prevent the bridge electrode line 132 from connecting to the second electrode pattern 133 and interfering with normal sensing and detection of the touch sensor 13.

The insulation layer 137 may be disposed between the electrode layer and the bridge electrode line 132, to isolate the electrode layer from the bridge electrode line 132, so that the second electrode pattern 133 in the electrode layer and the bridge electrode line 132 are isolated and insulated from each other.

Specifically, during specific implementation, the insulation layer 137 may be disposed in a plurality of different manners. For example, the insulation layer 137 may be an isolated island structure. In this case, the insulation layer 137 is located only in an area between two second electrode patterns 133, to isolate the area between the two second electrode patterns 133 from the bridge electrode line 132. Alternatively, the insulation layer 137 may have a relatively large coverage area, for example, cover the entire electrode layer. An actual manner of disposing the insulation layer 137 may be correspondingly set according to a specific structure and requirement of the touch sensor 13.

In an optional manner, the bridge electrode line 132 and the electrode layer may be disposed at different layers, so that the bridge electrode line 132 and the second electrode pattern 133 are insulated, and the bridge electrode line 132 and the first electrode pattern 131 are connected by using a structure such as contact holes 1317. Specifically, the contact holes 1317 may be disposed on the first conductive units 1311, and two ends of the bridge electrode line 132 respectively cross connecting segments 1313 of two adjacent first conductive units 1311, and are electrically connected to the contact holes 1317.

Because the bridge electrode line 132 and the electrode layer are located at different layers, the bridge electrode line 132 and the second electrode pattern 133 in the electrode layer may be insulated from each other. The contact holes 1317 are disposed on the first conductive units 1311 in the first electrode pattern 131, and the contact holes 1317 may connect the electrode layer and a layer at which the bridge electrode line 132 is located, so that the contact holes 1317 connect the bridge electrode line 132 and the first conductive units 1311, thereby implementing mutual connection between the first conductive units 1311 in the first electrode pattern 131.

In addition, another connection manner well known by a person skilled in the art may be used to connect the bridge electrode line 132 and the first conductive units 1311. For example, the bridge electrode line 132 and the first conductive units 1311 are in direct contact with each other and connected. This is not limited herein.

Optionally, the contact holes 1317 on the two adjacent first conductive units 1311 may be interleaved. In this way, positions of contact holes 1317 on different first conductive units 1311 are staggered, so that an overall extension direction of the bridge electrode line 132 is not the X-axis direction or the Y-axis direction, thereby reducing stress concentration phenomena in the overall extension direction of the bridge electrode line 132.

The contact hole 1317 may be a round hole, an elliptical hole, an elongated hole, or the like. Optionally, the contact hole 1317 may be a round hole. When the display 10 is bent, forces on the round hole are relatively uniform.

To enhance flexibility of the touch sensor 13 and avoid a phenomenon such as a crack occurring due to stress concentration when the touch sensor 13 and the touch display are bent, a structure that can release stress may be further disposed inside the touch sensor 13 to avoid stress concentration. In an optional manner, an etched stripe is disposed inside the touch sensor 13. Because a cavity or a gap is formed inside the etched stripe, when the touch display is bent, edges of opposite sides of the etched stripe may deform to be close to or away from each other as the touch display is bent, so that a deformation space is provided at a position of the etched stripe, and stress is released at the position of the etched stripe, to avoid stress concentration and tearing of the touch sensor 13 at the position of the etched stripe.

The touch sensor 13 further includes at least one first etched stripe 134 and at least one second etched stripe 135, and extension directions of the first etched stripe 134 and the second etched stripe 135 are interleaved with each other.

Because the touch sensor 13 and the entire touch display may be bent in a plurality of angles and directions, correspondingly, to release stress during bending when the touch sensor 13 is bent in different directions, correspondingly, the sensing pattern unit has a first etched stripe 134 and a second etched stripe 135 that respectively extend in different directions. The first etched stripe 134 and the second etched stripe 135 may respectively provide deformation spaces in different directions, to release stresses in different directions, so that the touch sensor 13 can avoid a tearing when bent in different directions.

Because the first electrode pattern 131 and the second electrode pattern 133 of the touch sensor 13 are respectively configured to detect touch actions in different directions, correspondingly, in this embodiment, the extension directions of the etched stripes may be consistent with sensing directions of the first electrode pattern 131 and the second electrode pattern 133. Specifically, each first etched stripe 134 may be parallel to the bridge electrode line 132, and each second etched stripe 135 may be perpendicular to the bridge electrode line 132.

In this case, the first etched stripe 134 and the second etched stripe 135 are interleaved with each other and are disposed at a substantially perpendicular angle to each other. In this way, the first etched stripe 134 and the second etched stripe 135 may cooperate with each other, and release stress in different directions that is generated when the touch sensor 13 and the touch display are bent.

There may be one or more first etched stripes 134 and second etched stripes 135. When the touch sensor 13 and the touch display are bent, a bent area may be located at different positions on the touch display. Therefore, correspondingly, there may be a plurality of first etched stripes 134 and second etched stripes 135, which are arranged at intervals on the touch sensor 13.

For example, the first etched stripes 134 and the second etched stripes 135 may be uniformly arranged on the first electrode pattern 131 and the second electrode pattern 133 of the touch sensor 13, so that each part of the first electrode pattern 131 and the second electrode pattern 133 can release stress by relying on the etched stripe, to avoid stress concentration and tear phenomena of the touch sensor 13.

When the sensing pattern unit of the touch sensor 13 includes the dummy pattern 136, optionally, the first etched stripe 134 and the second etched stripe 135 may also be disposed in the dummy pattern 136, and an arrangement manner of the first etched stripe 134 and the second etched stripe 135 in the dummy pattern 136 is the same as that of the etched stripes on the first electrode pattern 131 or the second electrode pattern 133. In this way, the first etched stripe 134 and the second etched stripe 135 are disposed in both the sensing pattern and the dummy pattern 136 of the touch sensor 13. Therefore, coverage of the etched stripes is relatively large, and each part of the touch sensor 13 has a relatively good effect of preventing stress concentration.

To enable the first etched stripe 134 and the second etched stripe 135 to have a relatively good stress release effect, optionally, the first etched stripe 134 and the second etched stripe 135 may be wholly or partially in an arc shape. It can be learned from the foregoing description that similar to a shape of the boundary line 1312 of the first electrode pattern 131, when the first etched stripe 134 and the second etched stripe 135 are wholly or mostly in an arc shape, because included angles are present between an arc and both transverse and longitudinal directions of the touch sensor 13, when the touch sensor 13 and the entire touch display are bent along a transverse or longitudinal bending axis, the first etched stripe 134 and the second etched stripe 135 may eliminate a stress concentration phenomenon during bending by using the arc, thereby avoiding a crack.

When the first etched stripe 134 and the second etched stripe 135 are wholly or partially in an arc shape, the first etched stripe 134 and the second etched stripe 135 may specifically have a plurality of different shapes.

For example, in an optional implementation, the first etched stripe 134 and the second etched stripe 135 may be wholly formed in an arc shape. In this case, the first etched stripe 134 or the second etched stripe 135 is an arc shape that is relatively uniform in width and curves along a subtended angle.

Different first etched stripes 134 or different second etched stripes 135 may have different bending directions. Using the first etched stripe 134 as an example, the plurality of first etched stripes 134 may be arranged at intervals along a direction, and bending directions of two adjacent first etched stripes 134 may be opposite to each other. Specifically, one of the two adjacent first etched stripes 134 protrudes towards a first conductive unit 1311, and the other first etched stripe 134 protrudes towards a direction opposite thereto, that is, a direction of another first conductive unit 1311. In this way, bending directions of the two adjacent first etched stripes 134 or the second etched stripes 135 are different, so that stress at the two adjacent first etched stripes 134 or the two adjacent second etched stripes 135 can be effectively dispersed, thereby improving a stress release effect.

In another optional implementation, the first etched stripe 134 and the second etched stripe 135 may be partially in an arc shape, for example, may be an I shape, where a connecting portion 1341 in the middle of the I shape may be an arc.

Specifically, the first etched stripe 134 or the second etched stripe 135 may have a middle segment that is an arc with a relatively uniform width and curving along a subtended angle, and two ends with a width greater than the width of the middle segment, so that the first etched stripe 134 or the second etched stripe 135 have a shape similar to that of a dumbbell. When the first etched stripe 134 and the second etched stripe 135 are in an I shape having a larger width at end portions, the end portions having a larger width can effectively release stress at end portions of the first etched stripe 134 or the second etched stripe 135, to avoid a situation in which a tear occurs in an extension direction of the first etched stripe 134 or the second etched stripe 135 because stress of the first etched stripe 134 or the second etched stripe 135 is concentrated on the end portions of the stripe.

Similar to the foregoing implementation, when the first etched stripe 134 and the second etched stripe 135 are in an I shape, bending directions of connecting portions 1341 in middle segments of the first etched stripe 134 and the second etched stripe 135 may vary with different first etched stripes 134 or second etched stripes 135. For example, one of two adjacent first etched stripes 134 protrudes towards one direction, and the other first etched stripe 134 protrudes towards a direction opposite thereto. In this way, the middle segments of the first etched stripe 134 and the second etched stripe 135 are bent in different directions, so that stress of the two adjacent first etched stripes 134 or the two adjacent second etched stripes 135 can be dispersed, thereby avoiding a tear phenomenon.

In addition, a person skilled in the art may understand that, in still another optional implementation, the first etched stripe 134 may be wholly in an arc shape, while the second etched stripe 135 is in an I shape with a connecting portion 1341 being an arc. Alternatively, the first etched stripe 134 is in an I shape with a connecting portion 1341 being an arc, while the second etched stripe 135 is wholly in an arc shape.

The first etched stripe 134 and the second etched stripe 135 may have different shapes. This is not limited herein.

In addition, the first etched stripe 134 and the second etched stripe 135 may be in other different shapes. For example, the first etched stripe 134 and the second etched stripe 135 may be in an "S" shape, or may be in another form of arcs that can release stress and avoid stress concentration. Details are not described herein.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A touch sensor, comprising: a substrate;
an electrode layer formed on the substrate and comprising a first electrode pattern comprising a plurality of first conductive units spaced from each other,
each first conductive unit including a first connecting portion and a second connecting portion, the first and second connecting portions being disposed on opposite sides of the first conductive unit,
each first conductive unit being bounded by an exterior boundary comprising a first connecting segment that bounds a side of the first connecting portion and a second connecting segment that bounds a side of the second connecting segment, the entire first connecting segment being characterized as having a continuously serpentine shape and including a first concave portion joining a first convex portion; and a bridge electrode, wherein one end of the bridge electrode connects to a first connecting portion of one of two adjacent first conductive units of the plurality of first conductive units and another end of the bridge electrode connects to a second connecting portion of a second of the two adjacent first conductive units to electrically connect the two adjacent first conductive units, the bridge electrode being characterized as having a continuously serpentine shape and a second concave portion joining a second convex portion.

2. The touch sensor according to claim 1, wherein the boundary of each first conductive unit forms a polygon, the first connecting segment forms an edge of the polygon, and a rounded corner transition is disposed between the first connecting segment and an adjacent edge of the polygon.

3. The touch sensor according to claim 2, wherein each of the first convex portion and the first concave portion of the first connecting segment are arc-shaped; and
each of the second convex portion and the second concave portion of the bridge electrode are arc-shaped.

4. The touch sensor according to claim 1, wherein the first and second connecting segments of the two adjacent first conductive units are disposed opposite to each other, and the first concave portion on the first connecting segment of one of the first conductive units of the two adjacent first conductive units is aligned with the first convex portion on the second connecting segment of the other adjacent first conductive unit of the two adjacent first conductive units.

5. The touch sensor according to claim 1,
further comprising a second bridge electrode also including a second concave portion and a second convex portion and connecting to the first and second connecting portions of the two adjacent first conductive units.

6. The touch sensor according to claim 1, wherein the electrode layer further comprises a second electrode pattern comprising a plurality of sequentially electrically connected second conductive units.

7. The touch sensor according to claim 6, wherein the first conductive units in the first electrode pattern are arranged in a first direction, the second conductive units in the second electrode pattern are arranged in a second direction, and the first direction is perpendicular to the second direction.

8. The touch sensor according to claim 1, wherein the first conductive units include vias, and the two ends of the bridge electrode respectively connect to the first and second connecting portions of the two adjacent first conductive units through the vias.

9. The touch sensor according to claim 8, wherein the vias on the two adjacent first conductive units are staggered such that a line from a via on the first connecting portion of the one first conductive unit to a via on first connecting portion of the other first conductive unit does not intersect a via on the second connecting portion of the one first conductive unit.

10. The touch sensor according to claim 1,
further comprising a plurality of first stripe cavities disposed in the electrode layer and a plurality of second stripe cavities disposed in the electrode layer.

11. The touch sensor according to claim 10, wherein the plurality of first stripe cavities are is in an arc shape or an I shape; and
the plurality of second stripe cavities are is in the arc shape or the I shape.

12. The touch sensor according to claim 10, wherein the plurality of first stripe cavities and the plurality of second stripe cavities are staggered such that a line through each of the plurality of first stripe cavities is parallel to a line through each of the plurality of second stripe cavities.

13. A touch display, comprising:
a display and the touch sensor according to claim 1, wherein the touch sensor is located on the display.

14. An electronic device, comprising:
a housing and the touch display according to claim 13, wherein the touch display is connected to the housing, and the touch display and the housing are connected together to form an accommodation space for accommodating a component.

* * * * *

UNITED STATES PATENT AND TRADEMARK OFFICE
CERTIFICATE OF CORRECTION

PATENT NO. : 11,899,891 B2  
APPLICATION NO. : 17/639793  
DATED : February 13, 2024  
INVENTOR(S) : Huan Wang et al.

Page 1 of 1

It is certified that error appears in the above-identified patent and that said Letters Patent is hereby corrected as shown below:

In the Claims

In Column 18, Line 41, in Claim 11, after "are" delete "is".

In Column 18, Line 43, in Claim 11, after "are" delete "is".

Signed and Sealed this  
Seventh Day of May, 2024

Katherine Kelly Vidal  
*Director of the United States Patent and Trademark Office*